(12) United States Patent
Mallat (10) Patent No.: US 12,028,444 B2
(45) Date of Patent: Jul. 2, 2024

(54) USING NFC TO CONFIGURE ULTRA LOW POWER BLUETOOTH® DEVICES

(71) Applicant: Silicon Laboratories Inc., Austin, TX (US)

(72) Inventor: Hannu Mallat, Hyvinkää (FI)

(73) Assignee: Silicon Laboratories Inc., Austin, TX (US)

( * ) Notice: Subject to any disclaimer, the term of this patent is extended or adjusted under 35 U.S.C. 154(b) by 241 days.

(21) Appl. No.: 17/699,704

(22) Filed: Mar. 21, 2022

(65) Prior Publication Data

US 2023/0299946 A1    Sep. 21, 2023

(51) Int. Cl.
*H04L 9/08* (2006.01)
*H04L 9/30* (2006.01)
*H04L 9/32* (2006.01)
*H04W 4/80* (2018.01)

(52) U.S. Cl.
CPC .......... *H04L 9/0841* (2013.01); *H04L 9/0858* (2013.01); *H04L 9/3066* (2013.01); *H04L 9/3263* (2013.01); *H04W 4/80* (2018.02); *H04L 2209/80* (2013.01)

(58) Field of Classification Search
CPC ... H04L 9/0841; H04L 9/0858; H04L 9/3066; H04L 9/3263; H04L 2209/80; H04L 2209/805; H04L 9/088; H04L 9/0891; H04L 9/0894; H04W 4/80
See application file for complete search history.

(56) References Cited

U.S. PATENT DOCUMENTS

| | | | |
|---|---|---|---|
| 2016/0099920 A1* | 4/2016 | Meuleman | H04L 63/18 713/153 |
| 2017/0004692 A1* | 1/2017 | Britt | H04L 12/413 |
| 2019/0286805 A1* | 9/2019 | Law | G06F 21/34 |
| 2020/0008051 A1* | 1/2020 | Hill | H04W 12/04 |

FOREIGN PATENT DOCUMENTS

WO    WO-2017168228 A1 * 10/2017 ............. H04L 63/08

* cited by examiner

*Primary Examiner* — Abiy Getachew
(74) *Attorney, Agent, or Firm* — NIELDS, LEMACK & FRAME, LLC (57) ABSTRACT

An ultra low power network device is disclosed. The network device utilizes a Near Field Communications (NFC) tag to enable ultra low power communications with a configuration tool. The configuration tool writes information to the NFC tag that is accessible by the processing unit on the ultra low power network device. Additionally, the processing unit can write information into the NFC tag that is readable by the configuration tool. By exchanging messaged in this manner, the ultra low power network device and the configuration tool may create a shared encryption key. The ultra low power network device utilizes this shared encryption key when transmitting BLUETOOTH® packets. The configuration tool may then transmit the shared encryption key to either another BLUETOOTH® device or to a remote server. The ultra low power network device may also periodically refresh the shared encryption key.

18 Claims, 5 Drawing Sheets

USING NFC TO CONFIGURE ULTRA LOW POWER BLUETOOTH® DEVICES

FIELD

This disclosure describes systems and methods for configuring an ultra low power BLUETOOTH® device, and more particularly using Near Field Communications (NFC) to configure the device and share encryption keys.

BACKGROUND

Certain wireless applications require the use of energy harvesting devices that should operate in a maintenance free mode for long periods, up to years, and require neither an internal battery nor an external electric power source. Examples of these are sensors of various kinds that provide data readings over a wireless communications medium. These readings are then processed further at the receiver or elsewhere in the wireless network. In the case of BLUETOOTH® LE based communications, such readings would typically be provided as advertisement broadcasts that devices in range can listen to and receive.

The benefit of a wireless sensor is that the installation is very simple, requiring no routing of power or data cables. Energy harvesting operation frees the operator from the need of battery maintenance as well. On the other hand, energy harvesting based operation means that the power budget available to the device is minimal and the extreme small power budget limits the way these devices may operate.

There are multiple energy harvesting techniques that may be used, including light, thermal, and RF radiation energy harvesting. Common to all of these is that the harvested power density is quite low, so a device would typically need to accumulate enough electric energy to a capacitor before executing an operation that uses up a significant amount of energy, such as a RF transmission. This also means that RF reception is not possible except for the shortest of periods, as receiving data consumes roughly the same amount of power as transmitting data at a moderate transceiver power. Further, any reception would preferably need to be exactly synchronized with the time the data is being transmitted, to keep the reception window as short as possible and avoid wasting energy. Such tight synchronization over longer periods of time would however require very accurate (and thus expensive) oscillators or relatively frequent communication synchronization points to correct for timing drift.

Also, interactive communication (e.g., in response to a received message or a hardware event such as a button push) may not be possible if there is not enough energy stored in the device at the time.

Therefore, it would be beneficial if the device did not have to receive any data. However, this would make it impossible to provide configuration data to the device. This configuration data may include any encryption keys. Consequently, such a device would either have no security (and would send its messages in plaintext) or would have a pre-configured encryption key for encrypting its messages, which opens possibilities for a bad actor. If a bad actor acquires the pre-configured key, the bad actor can monitor the data that the device sends in real time. The bad actor might also be able to impersonate the device by sending messages of their own and encrypting them using the preconfigured key. Not all use cases require secure communications, but for those that do neither of the above alternatives is acceptable.

Thus, it would be beneficial if there were an ultra low power device that was able to utilize unique encryption keys. Further, to conserve energy, it would be advantageous if the network device did not have to receive any BLUETOOTH® communications.

SUMMARY

An ultra low power network device is disclosed. The network device utilizes a Near Field Communications (NFC) tag to enable ultra low power communications with a configuration tool. The configuration tool writes information to the NFC tag that is accessible by the processing unit on the ultra low power network device. Additionally, the processing unit can write information into the NFC tag that is readable by the configuration tool. By exchanging messaged in this manner, the ultra low power network device and the configuration tool may create a shared encryption key. The ultra low power network device utilizes this shared encryption key when transmitting BLUETOOTH® packets. The configuration tool may then transmit the shared encryption key to either another BLUETOOTH® device or to a remote server. The ultra low power network device may also periodically refresh the shared encryption key.

According to one embodiment, an ultra low power network device is disclosed. The ultra low power network device comprises a Near Field Communications (NFC) tag; a network interface; a processing unit; and an associated memory device, comprising instructions, which when executed by the processing unit, enable the ultra low power network device to: use the NFC tag to interact with an external configuration tool to create a shared encryption key; and use the shared encryption key to transmit encrypted packets using the network interface. In some embodiments, the network interface utilizes a BLUETOOTH® network protocol. In certain embodiments, the ultra low power network device transmits the encrypted packets as advertisement broadcasts. In some embodiments, periodically, the ultra low power network device generates a new shared encryption key. In certain embodiments, the new shared encryption key is generated after a predetermined amount of time has elapsed or a predetermined number of messages have been sent. In some embodiments, to create the shared encryption key, the associated memory device further comprises instructions, which when executed by the processing unit, enable the ultra low power network device to create an ephemeral elliptic curve key, resulting in a device EC public key and a device EC private key; create a first random number; share the device EC public key and the first random number by writing the device EC public key and the first random number in the NFC tag; receive a configurator EC public key and a second random number from the external configuration tool; read the configurator EC public key and the second random number from the NFC tag; calculate an elliptic curve Diffie-Hellman (ECDH) secret using the device EC private key and the configurator EC public key; and use a key derivation function that takes the ECDH secret, the first random number and the second random number as inputs to create the shared encryption key. In certain embodiments, after creating the shared encryption key, the associated memory device further comprises instructions, which when executed by the processing unit, enable the ultra low power network device to write an acknowledgement message in the NFC tag, wherein the acknowledgement message comprises the first random number and the second random number encrypted using the shared encryption key. In certain embodiments, the associated memory device further comprises instructions, which when executed by the processing unit, enable the ultra low power network device to periodically refresh the shared encryption key; wherein the instructions enable the ultra low power network device to increment the first random number and the second random number by a predetermined quantity to create a new first random number and a new second random number; and use a key derivation function that takes the ECDH secret, the new first random number and the new second random number as inputs to create a new shared encryption key. In some embodiments, wherein a device EC private key is stored in the ultra low power network device and a device EC public key is made available in an X.509 certificate. In certain embodiments, to create the shared encryption key, the associated memory device further comprises instructions, which when executed by the processing unit, enable the ultra low power network device to create a first random number; share the X.509 certificate or a URL of the X.509 certificate and the first random number by writing the X.509 certificate or the URL of the X.509 certificate and the first random number in the NFC tag; receive a configurator EC public key and a second random number from the external configuration tool; read the configurator EC public key and the second random number from the NFC tag; calculate an elliptic curve Diffie-Hellman (ECDH) secret using the device EC private key and the configurator EC public key; and use a key derivation function that takes the ECDH secret, first random number and second random number as inputs to create the shared encryption key. In certain embodiments, after creating the shared encryption key, the associated memory device further comprises instructions, which when executed by the processing unit, enable the ultra low power network device to write an acknowledgement message in the NFC tag, wherein the acknowledgement message comprises the first random number and the second random number encrypted using the shared encryption key.

According to another embodiment, a system for receiving encrypted messages from an ultra low power network device is disclosed. The system comprises a BLUETOOTH® network device; a configuration tool, comprising a first network interface supporting Near Field Communications (NFC); a processing unit; and an associated memory device; and an ultra low power network device, comprising a NFC tag; a BLUETOOTH® network interface; a processing unit; and an associated memory device, comprising instructions, which when executed by the processing unit, enable the ultra low power network device to use the NFC tag to interact with the configuration tool to create a shared encryption key; and use the shared encryption key to transmit encrypted packets to the BLUETOOTH® network device using the BLUETOOTH® network interface. In some embodiments, the configuration tool transmits the shared encryption key to the BLUETOOTH® network device. In certain embodiments, the BLUETOOTH® network device and the configuration tool each comprise an additional network interface and the shared encryption key is transmitted securely via the additional network interface. In some embodiments, the configuration tool comprises a BLUETOOTH® network interface and the shared encryption key is transmitted to the BLUETOOTH® network device using an encrypted point-to-point connection. In some embodiments, the shared encryption key is generated using two random numbers and a ECDH secret, and the configuration tool transmits the two random numbers and the ECDH secret to the BLUETOOTH® network device. In certain embodiments, the system further comprises a server in communication with the BLUETOOTH® network device and the configuration tool, wherein the BLUETOOTH® network device transmits the encrypted packets to the server, and the server decrypts the encrypted packets using the shared encryption key. In some embodiments, the configuration tool securely transmits the shared encryption key to the server. In some embodiments, the shared encryption key is generated using two random numbers and a ECDH secret, and the configuration tool securely transmits the two random numbers and the ECDH secret to the server.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
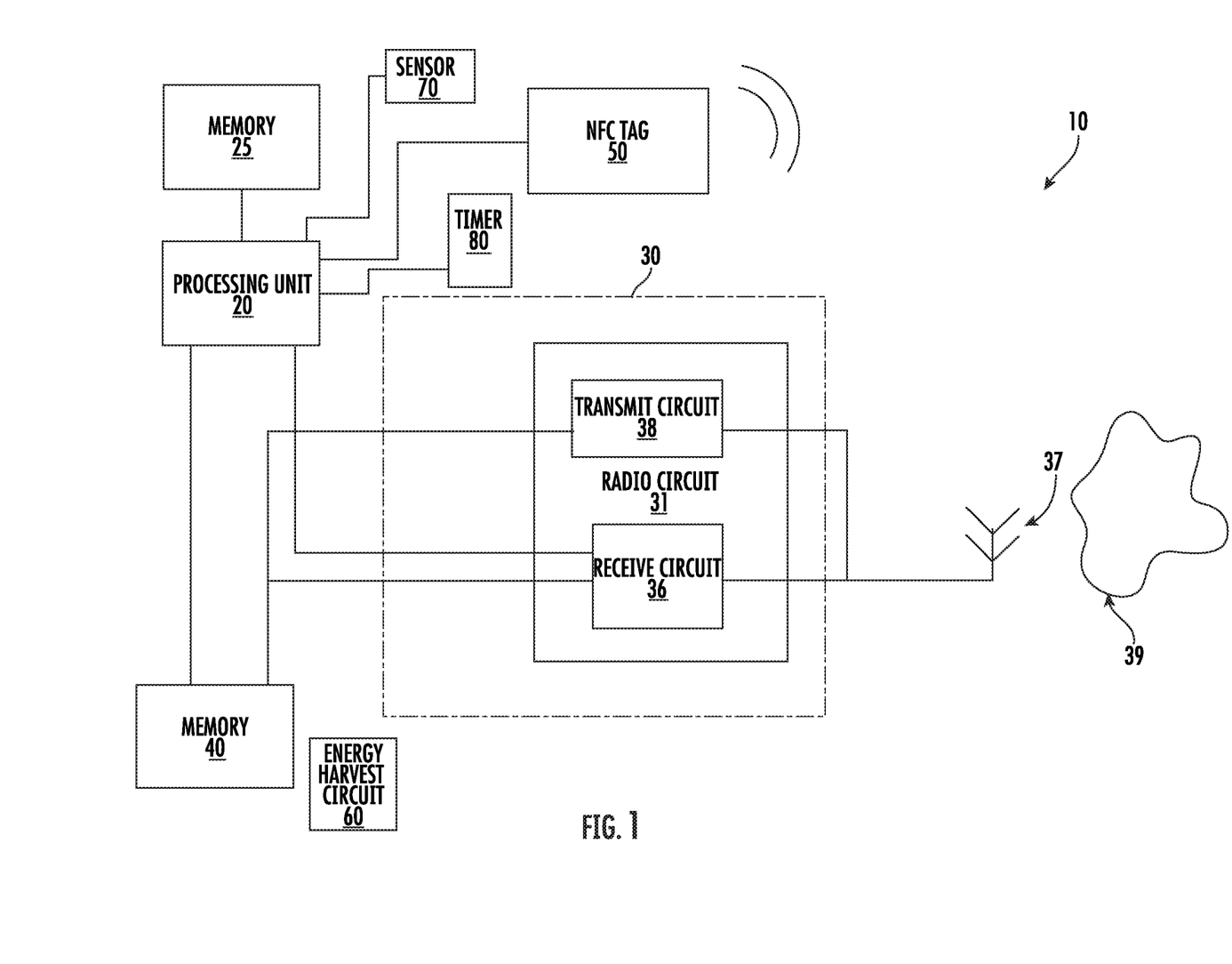
FIG. 1 is a block diagram of an ultra low power network device according to one embodiment.

FIG. 1 shows an ultra low power network device according to one embodiment. The ultra low power network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the ultra low power network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The ultra low power network device 10 may include a timer 80, which may be used for key refresh, as described below.

The ultra low power network device 10 also includes a network interface 30, which may be a wireless network interface that includes an antenna 37. The network interface 30 may support the BLUETOOTH® network protocol. The network interface 30 is used to allow the ultra low power network device 10 to communicate with other devices disposed on the BLUETOOTH® network 39.

The network interface 30 may include a radio circuit 31. This radio circuit 31 may be used to process an incoming signal and convert the wireless signals to digital signals. The radio circuit 31 is also used to transmit outgoing signals. The components within the radio circuit 31 are described in more detail below.

The radio circuit 31 includes a transmit circuit 38. The transmit circuit 38 may include a power amplifier that is used to supply a signal to be transmitted to the antenna 37.

The radio circuit 31 may also include a receive circuit 36. The receive circuit 36 is typically used to receive, synchronize and decode the digital signals received from the antenna 37. Specifically, the receive circuit 36 may have a preamble detector that is used to identify the start of an incoming packet. The receive circuit 36 also may have a sync detector, which is used to identify a particular sequence of bits that are referred to as a sync character. Additionally, the receive circuit 36 may have a decoder which is used to convert the digital signals into properly aligned bytes of data.

In certain embodiments, the ultra low power network device 10 is a transmission-only device which only transmits data to the BLUETOOTH® network 39, either periodically or when it needs to communicate a new reading, and does not receive any data from other BLUETOOTH® devices.

In this scenario, the ultra low power network device 10 does not include a receive circuit 36, resulting in an optimized hardware design. Further, in the case of a BLUETOOTH® LE device, there is no need for the ultra low power network device 10 to maintain a connection with its strict timing requirements, so a less accurate and thus less expensive oscillator may be used when manufacturing the device.

Such a transmission-only device may also be optimized in the software that is executed, as there would not be a need to include functionality for protocols that build on top of LE connections. Further, there is no need for any code for processing incoming BLUETOOTH® advertisements. This would allow the memory device 25 to have a smaller footprint for the firmware image that is programmed into the ultra low power network device 10.

Further, if the ultra low power network device 10 does not receive any BLUETOOTH® packets containing encrypted data, there is also no need for decryption hardware or software.

The ultra low power network device 10 may include a second memory device 40. Data that is received from the network interface 30 or is to be sent via the network interface 30 may also be stored in the second memory device 40. This second memory device 40 is traditionally a volatile memory.

Figure 2:
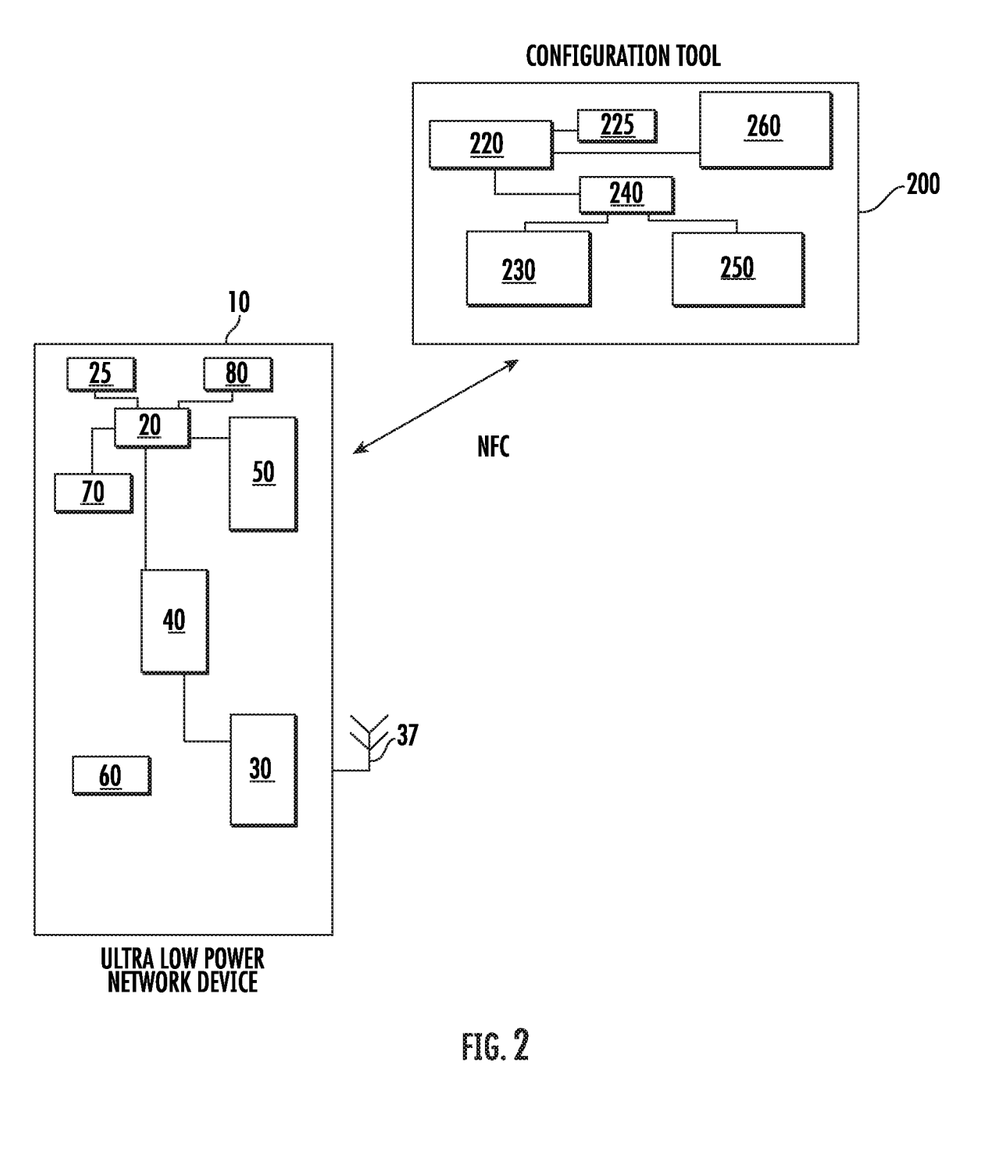
FIG. 2 shows the key agreement protocol between the ultra low power and the configuration tool.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the ultra low power network device 10. The instructions contained on this second computer readable non-transitory media may be downloaded onto the memory device 25 to allow execution of the instructions by the ultra low power network device 10.

While the processing unit 20, the memory device 25, the network interface 30 and the second memory device 40 are shown in FIG. 1 as separate components, it is understood that some or all of these components may be integrated into a single electronic component. Rather, FIG. 2 is used to illustrate the functionality of the ultra low power network device 10, not its physical configuration.

The ultra low power network device 10 may include an energy harvest circuit 60. The energy harvest circuit 60 may include a transducer, a conversion circuit and an energy storage circuit. The transducer receives an input and converts this input into electrical energy. In one embodiment, the transducer may be a photosensor, which receives light and converts the light into electrical energy. In another embodiment, the transducer may be a thermoelectric transducer, which converts heat to electrical energy. In another embodiment, the transducer may be a piezoelectric device, which converts vibration or movement to electrical energy. In another embodiment, the transducer may be a RF transducer, which converts RF energy into electrical energy. In yet another embodiment, the transducer may be an inductive transducer, which converts magnetic fields to electrical energy. Note that in each of these embodiments, the input energy is received by the energy harvest circuit without any physical electrical connections.

The electrical energy produced by the transducer is conditioned by the conversion circuit. The conversion circuit is used to collect the energy output by the transducer and convert this to a desired voltage, such as 1.8V, 3.3V, 5V or some other voltage. The output from the conversion circuit is then stored in the energy storage circuit. In certain embodiments, the energy storage circuit comprises one or more capacitors and support circuits.

The output of the energy storage circuit may be used to supply power to the rest of the components.

The ultra low power network device 10 also comprises a Near Field Communications (NFC) tag 50. The NFC tag 50 is used to receive and transmit packets using the NFC network protocol. As such, the NFC tag 50 is able to receive and transmit in the absence of a power supply. In other words, the energy received from the device that is communicating with the NFC tag 50 provides the power necessary for the NFC tag 50 to operate on the NFC network. The NFC tag 50 may include an internal memory, which may be nonvolatile. The NFC tag 50 also comprises the circuitry needed to transmit and receive NFC communications. Additionally, the NFC tag 50 may have a second interface that is used to communicate with the processing unit 20. In certain embodiments, this second interface may be SPI or $I^2C$, although other protocols may also be used. The NFC tag 50 may be used to convey messages back and forth, and it can also provide a signal to the processing unit 20 when it is being accessed, allowing the network device to save energy in a low power state until the time that communications take place. In some embodiments, the power for the NFC tag 50 is sourced separately from the rest of the device so that the NFC tag 50 can be active while the rest of the device is in a low power state.

Further, the ultra low power network device may not include a battery or a connection to a permanent power source, such as a wall outlet.

In normal operation, the ultra low power network device 10 may be in a default low power state. This low power state may be a sleep state. In other embodiments, the low power state may remove power to many of the components in the device.

Periodically, the ultra low power network device 10 may be awakened. For example, in certain embodiments, a timer 80 is used to wake the processing unit 20 at regular intervals. In other embodiments, an external event, such as an interrupt may be used to awaken the processing unit 20. While awake, the processing unit 20 may transmit a packet over the BLUETOOTH® network 39. For example, the ultra low power network device 10 may include a sensor 70. The sensor 70 may be a temperature sensor, a pressure sensor, a flow rate sensor, a pH sensor, or any other sensor used to measure a parameter.

The processing unit 20 may transmit a BLUETOOTH® packet that includes the current reading of the sensor 70. After transmission, the processing unit 20 may return to the low power state.

However, in certain embodiments, it is preferable or desired that the BLUETOOTH® packet be encrypted with a key. There are several ways that a key may be negotiated with the configuration tool. FIG. 2 show an example of an ultra low power network device 10, and a configuration tool 200 during a key agreement protocol.

The configuration tool 200 may be any device that includes an NFC interface. The configuration tool 200 has a processing unit 220 and an associated memory device 225. This memory device 225 contains the instructions, which, when executed by the processing unit 220, enable the configuration tool 200 to perform the functions described herein. This memory device 225 may be a non-volatile memory, such as a FLASH ROM, an electrically erasable ROM or other suitable devices. In other embodiments, the memory device 225 may be a volatile memory, such as a RAM or DRAM. In certain embodiments, the memory device 225 may be packaged with the processing unit 220. The processing unit 220 may be any suitable device, including but not limited to a general purpose processor, an application specific processor, an embedded controller, or a personal computer (PC).

The configuration tool 200 also includes a first network interface 230, which supports an NFC interface. In certain embodiments, the configuration tool 200 may include a second network interface 250, different from the first network interface 230. This second network interface 250 may support a wired network, or a wireless network, such as BLUETOOTH®, WIFI or other protocols.

The configuration tool 200 may include a second memory device 240 in which data that is received by the first network interface 230, and data that is to be transmitted by the first network interface 230, is stored. Additionally, data sent and received by the second network interface 250 may be stored in the second memory device 240. This second memory device 240 is traditionally a volatile memory. The processing unit 20 has the ability to read and write the second memory device 240 so as to communicate with the other devices in the network. Although not shown, the configuration tool 200 also has a power supply, which may be a battery or a connection to a permanent power source, such as a wall outlet.

While a memory device 225 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 220, as shown in FIG. 2. The second computer readable media may be a CDROM, or a different memory device, which is located remote from the configuration tool 200. The instructions contained on this second computer readable media may be downloaded onto the memory device 225 to allow execution of the instructions by the configuration tool 200.

The configuration tool 200 may also include a display element 260. In some embodiments, the display element 260 may be a LED or LCD screen. In certain embodiments, the display element 260 is a touch screen so that input may be supplied to the processing unit 220 through the display element 260. In other embodiments, the configuration tool 200 may also be in communication with a separate input device to allow user entry. The input device may be a keyboard, for example.

Any device that includes the components enumerated above may be used as the configuration tool. In one specific embodiment, the configuration tool 200 may be a mobile telephone or tablet computer. In certain embodiments, the instructions described herein may be packaged as a software application. The configuration tool 200 may receive the software application from a remote server. For example, in one embodiment, an application may be made available on a remote server, such as a corporate server. In certain embodiments, the application may be available on a digital distribution platform, such as Google Play, Microsoft Store, the Apple App Store and others. Of course, in other embodiments, the software may be pre-loaded onto the configuration tool 200.

In one embodiment, a key agreement protocol is defined between the ultra low power network device 10 and the configuration tool 200 when placing the ultra low power network device 10 into use. The key agreement protocol is used to generate a shared encryption key.

Advantageously, NFC protocol may be used to create this shared encryption key. While NFC technology works only at very short distances compared to BLUETOOTH®, this is acceptable when installing devices and configuring them for operation, since the operator would be in the vicinity of the device.

NFC is frequently incorporated in modern smartphones. Therefore, smartphone applications may be written that use NFC to configure these ultra low power network devices, and no specialized hardware would be needed by the operator installing and configuring the devices.

Most importantly for devices that have ultra low power budgets, the NFC tag 50 can communicate in energy harvesting mode. That is, while the ultra low power network device 10 needs to expend some small amount of power to read and write the configuration messages to the NFC tag 50 over the local interface, the RF communications between the ultra low power network device 10 and the configuration tool 200 are powered by the RF field generated by the configuration tool 200.

The NFC communications in the processes described herein can be executed by reading and writing NFC Data Exchange Format (NDEF) messages to the NFC tag 50. While NDEF messages incur some protocol overhead, they are widely supported across multiple tag technologies. NDEF messages comprise a header and a number of TLV (type-length-value) entries that follow, containing the actual payload data and metadata needed for processing. To perform the key agreement protocol described below, two types of NDEF messages need to be defined:

Data exchange message which contains an EC public key (or certificate, or certificate URL) and a random number; and Acknowledgement message which contains two random numbers.

Based on the information that needs to be exchanged in each of these types of messages, it is believed that a NDEF message length of about 100 bytes may be sufficient. In addition to transmitting the keys and random numbers, additional fields may be defined in these messages. For example, an auxiliary data field may be defined in one or both of these message types. For example, the auxiliary data field may be used to describe the refresh parameters, such as refresh rate and method, supported by the ultra low power network device 10. Additionally, the auxiliary data field may be used to define the refresh parameters that the configuration tool 200 selected.

Having described the format of the messages, the key agreement protocol will be described. This key agreement protocol is used to establish an encryption key to use that is not known a priori. Elliptic Curve Diffie-Hellman (ECDH) is widely used in BLUETOOTH® and BLUETOOTH® Mesh networks, and may be used in this application as well. When using ECDH, both devices have an elliptic curve key and make the public part of their key available to the other device while retaining the private part of their key to themselves. The result of the ECDH calculation is a shared secret, calculated by both devices independently.

The shared secret can then be used in further calculations to derive an encryption key that the ultra low power network device 10 will use and the configuration tool 200 will know. To provide entropy for the encryption key derivation, the ultra low power network device 10 and the configuration tool 200 can create random numbers as additional inputs to key derivation. Depending on the use case, the random number could be, for example, 64, 128 or 256 bits long. In other embodiments, random numbers may not be used.

Key derivation function to be used can be based, for example, on HMAC-SHA-256. BLUETOOTH® and BLUETOOTH® Mesh networks use the NIST P-256 curve for the EC keys, and therefore, this implementation may be utilized here.

The process for the key agreement may be as follows:
1. The ultra low power network device 10 creates a first random number for itself.
2. The ultra low power network device 10 creates a first ephemeral elliptic curve (EC) key for itself. This results in a device EC public key and a device EC private key.
3. The processing unit 20 writes the device EC public key and the first random number to the NFC tag 50 over the local interface, such as I²C. This is a first data exchange message.
4. The configuration tool 200 reads the NFC tag 50 and acquires the device EC public key and the first random number.
5. The configuration tool 200 creates a second random number for itself.
6. The configuration tool 200 creates an ephemeral elliptic curve key for itself. This results in a configurator EC public key and a configurator EC private key.
7. The configuration tool 200 calculates the elliptic curve Diffie-Hellman (ECDH) secret using the configurator EC private key and the device EC public key.
8. The configuration tool 200 creates an encryption key using a key derivation function that takes the ECDH secret and both random numbers as input.
9. The configuration tool 200 writes the configurator EC public key and the second random number to the ultra low power network device 10 by writing the information into the NFC tag 50. This is a second data exchange message.
10. The configuration tool 200 discards its ephemeral key.
11. The ultra low power network device 10 reads the contents written to the NFC tag 50 and calculates the elliptic curve Diffie-Hellman (ECDH) secret using the device EC private key and the configurator EC public key from the configuration tool 200.
12. The ultra low power network device 10 creates an encryption key using a key derivation function that takes the ECDH secret and both random numbers as input.
13. The processing unit 20 writes an acknowledgement to the NFC tag 50, indicating that the ultra low power network device 10 now possesses the encryption key. The acknowledgement message may include the two random numbers encrypted with the encryption key.
14. The ultra low power network device 10 discards its ephemeral key, but saves the first random number, the second random number, and the ECDH secret, for key refresh as described below.
15. The configuration tool reads the acknowledgement from the NFC tag 50 and considers the ultra low power network device 10 now configured for secure communications if the message decrypts correctly.
16. The configuration tool 200 stores the first random number, the second random number, and the ECDH secret, for key refresh.

While ECDH can be used to set up a shared secret securely over an insecure communications channel, it does not provide authentication to the configuration tool 200 that the ultra low power network device is who they claim to be. Thus, a man-in-the-middle (MITM) attack could in principle be executed, wherein the attacker executes two ECDH processes, one between the ultra low power network device 10 and itself, and another between itself and the configuration tool 200. Such an attack can be prevented by authenticating the ultra low power network device 10. Given the short range of NFC, a MITM attack may be unlikely, but device authentication has other uses as well. For instance, the operator may wish to verify that only legitimate devices are added to the network, and thus be assured that the device being installed is what it is supposed to be. For authenticating the device, the EC public key of the device can be wrapped into an X.509 certificate, signed by a trusted party called a certification authority (CA). Provided the operator trusts the CA, the cryptographic signature of the certificate indicates that the certificate information comes from the CA and can thus be trusted. Thus, the certificate indicates that the EC public key it contains belongs to a legitimate device; and the device proves to be that same device by virtue of possessing the EC private key corresponding to the EC public key and, based on that, being able to calculate the correct ECDH shared secret. Furthermore, the signature protects the certificate contents from tampering by third parties, protecting the integrity of the EC public key.

The flow required to generate the encryption key is nearly the same as for the unauthenticated case. The major difference is that instead of the ultra low power network device 10 exposing its EC public key directly (as described in steps 3-4 above), it will either expose the EC public key wrapped in a certificate or a URL from where the certificate can be downloaded. The latter option may be needed if the length of the certificate is such that the certificate does not fit into the NFC tag 50.

The process for the key agreement with authentication is then as follows:
1. As a prerequisite, the ultra low power network device 10 has been assigned an elliptic curve key. The private part of the device key (the device EC private key) is securely stored within the ultra low power network device 10 and cannot be extracted from there, while the public part of the device key (the device EC public key) is made available in a X.509 certificate issued by a certification authority. Furthermore, if the certificate does not fit on the NFC tag 50 as is, it is made available on a server that is accessible to the configuration tool 200 and the URL pointing to the certificate is known to the ultra low power network device 10.

2. The ultra low power network device 10 creates a first random number for itself.
3. The processing unit 20 writes its certificate/certificate URL and the first random number to its NFC tag 50 over a local interface, such as I²C. This is a first data exchange message.
4. The configuration tool 200 reads the NFC tag 50 and acquires the device certificate/certificate URL and the first random number; if a URL is read, the configuration tool 200 accesses the URL to fetch the certificate.
5. The configuration tool 200 creates a second random number for itself.
6. The configuration tool 200 creates an ephemeral elliptic curve key for itself. This results in a configurator EC private key and a configurator EC public key.
7. The configuration tool 200 calculates the elliptic curve Diffie-Hellman (ECDH) secret using the configurator EC private key and the device EC public key from the ultra low power network device 10.
8. The configuration tool 200 creates an encryption key using a key derivation function that takes the ECDH secret and both random numbers as input.
9. The configuration tool pushes the configurator EC public key and the second random number to the ultra low power network device 10 by writing to the NFC tag 50. This is a second data exchange message.
10. The configuration tool 200 discards its ephemeral key.
11. The processing unit 20 reads the contents written to the NFC tag 50 and calculates the elliptic curve Diffie-Hellman secret using the device EC private key and the configurator EC public key from the configuration tool 200.
12. The device creates an encryption key using a key derivation function that takes the ECDH secret and both random numbers as inputs.
13. The processing unit 20 writes an acknowledgement to the NFC tag 50, indicating that it now possesses the encryption key. The acknowledgement message may be the two random numbers encrypted with the encryption key.
14. The ultra low power network device 10 stores the first random number, the second random number, and the ECDH secret, for key refresh, as described below.
15. The configuration tool 200 reads the acknowledgement from the NFC tag 50 and considers the ultra low power network device 10 now configured for secure communications if the message decrypts correctly.
16. The configuration tool 200 stores the first random number, the second random number, and the ECDH secret, for key refresh (see below).

Having established an encryption key, this encryption key may be refreshed periodically. Key refresh can be done by the ultra low power network device 10 by having the processing unit 20 read the stored ECDH secret and two random numbers (see steps 14 and 16 above), increment both numbers by a predetermined quantity, and re-calculate the key derivation to create new encryption keys.

The ultra low power network device 10 can trigger key refreshing by a number of means, including but not limited to:

A predetermined amount of time has elapsed (if the ultra low power network device 10 has the ability to keep time);
A predetermined number of messages have been sent;
An external event that can be detected happens, such as a button press or a pattern that is detected by a sensor, such as, for example, a pulsing light.

As described above, the parameters associated with key refresh may be communicated in the auxiliary data field of the NDEF messages.

In order to be able to decrypt the message, the recipient of the message must also derive the same new key. It can do this at the same time as the device (if it can be synchronized to ultra low power device via a timer or a trigger). Alternatively, the recipient may refresh the encryption key upon reception of an undecipherable message.

The above processes describe how the encryption key is created and shared between the ultra low power network device 10 and the configuration tool 200. However, in many embodiments, during normal operation, the configuration tool 200 is not present. Rather, the ultra low power network device 10 broadcasts its message to a different device that is disposed on the BLUETOOTH® network 39. As noted above, the ultra low power network device 10 may transmit encrypted information using advisement broadcasts.

Figure 3:
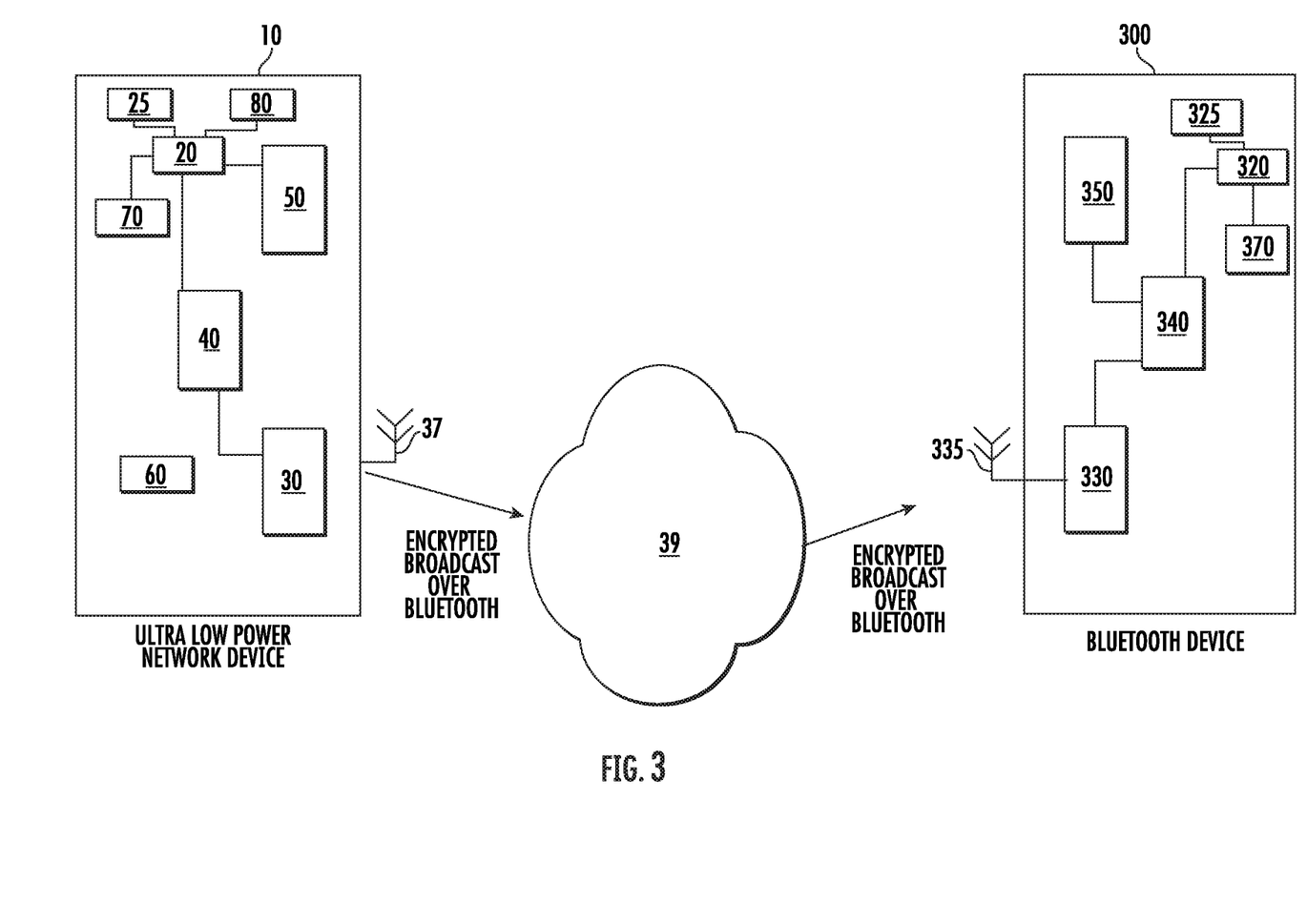
FIG. 3 shows normal operation between the ultra low power network device and the BLUETOOTH® device.

FIG. 3 shows the operation of the ultra low power network device 10 in normal operating mode. In this configuration, there is a BLUETOOTH® device 300 that is part of the BLUETOOTH® network 39 which the ultra low power network device 10 transmits on. The BLUETOOTH® device 300 may be any device within the BLUETOOTH® network 39, but may typically be a gateway.

The BLUETOOTH® device 300 also includes a processing unit 320, a memory device 325, a second memory device 340, a first network interface 330, an antenna 335, and optionally a second network interface 350. The first network interface 330 of the BLUETOOTH® device 300 utilizes the BLUETOOTH® network protocol. The processing unit 320, the memory device 325, the second memory device 340, the first network interface 330 and the antenna 335 may be similar to those components that are described above with respect to the ultra low power network device 10.

In certain embodiments, the BLUETOOTH® device 300 may include a connection to the internet. This connection may be using the second network interface 350 as described above, or may be a third network interface 370, such as Ethernet or WiFi.

Thus, periodically, the ultra low power network device 10 awakens, determines a sensor value, or some other parameter, and broadcasts this information on the BLUETOOTH® network 39. This may be performed using an advertisement broadcast. In certain embodiments, the broadcast is encrypted using the encryption key that was derived above with the configuration tool 200. The BLUETOOTH® device 300 receives this broadcast using the first network interface 330 and may act accordingly.

For the system to be operational, a device that is communication with the BLUETOOTH® device 300 must also have the encryption key.

In certain embodiments, the BLUETOOTH® device 300 may also possess the encryption key and thus be able to decrypt the broadcasts from the ultra low power network device 10.

The configuration tool 200 and the BLUETOOTH® device 300 may communicate using a variety of different network protocols. The transfer of the security key from the configuration tool 200 to the BLUETOOTH® device 300 is described below.

Figure 4:
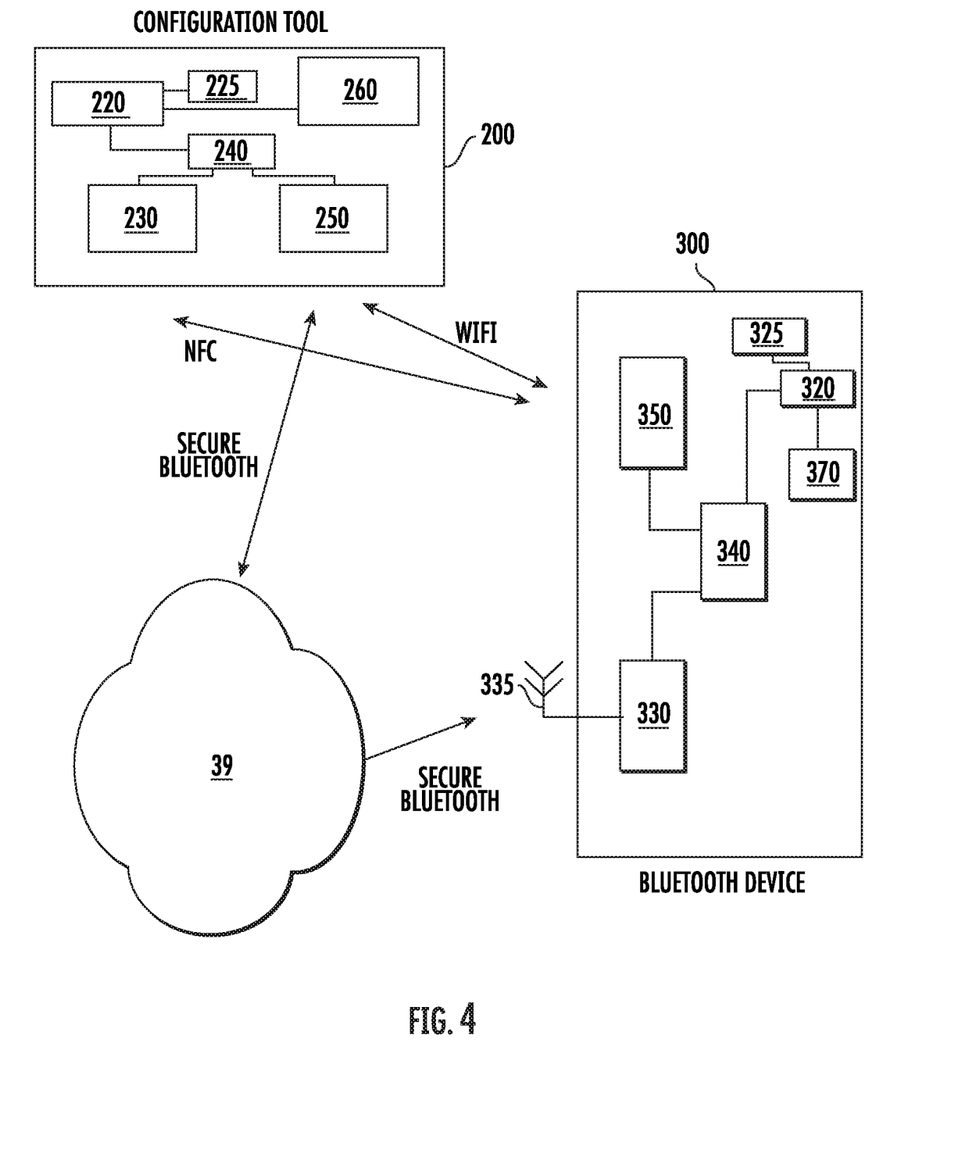
FIG. 4 shows the key exchange between the configuration tool and the BLUETOOTH® device.

In one embodiment, shown in FIG. 4, the configuration tool 200 forwards the encryption key, the two random numbers and the ECDH secret to the BLUETOOTH® device 300. This can be done in a plurality of ways.

In one embodiment, the second network interface 250 of the configuration tool 200 and the second network interface 350 of the BLUETOOTH® device 300 may both utilize an IEEE 802.11 based communication protocol, such as Ethernet or WIFI. In this embodiment, the encryption key, the two random numbers and the ECDH secret can be transmitted from the configuration tool 200 to the BLUETOOTH® device 300 using a suitable network protocol, such as HTTP or others, on top of Transport Layer Security (TLS).

In another embodiment, the second network interface 250 of the configuration tool 200 utilizes the BLUETOOTH® protocol. In this embodiment, the BLUETOOTH® device 300 may not have a second network interface 350. In this embodiment, an encrypted point-to-point connection, with a suitable profile, such as object transfer service, may be made between the configuration tool 200 and the BLUETOOTH® device 300. The encryption key, the two random numbers and the ECDH secret may then be transmitted from the configuration tool 200 to the BLUETOOTH® device 300 over this encrypted connection.

In yet another embodiment, the second network interface 350 of the BLUETOOTH® device 300 may support the NFC protocol. In this embodiment, the second network interface 250 may not be present. In this embodiment, the configuration tool 200 and the BLUETOOTH® device 300 may need to establish a secure channel. This may be done using the processes described above. Once an encryption key is created between the configuration tool 200 and the BLUETOOTH® device 300, the configuration tool 200 may then transmit the encryption key for the ultra low power network device 10, along with the ECDH secret and the two random numbers to the BLUETOOTH® device 300.

Figure 5:
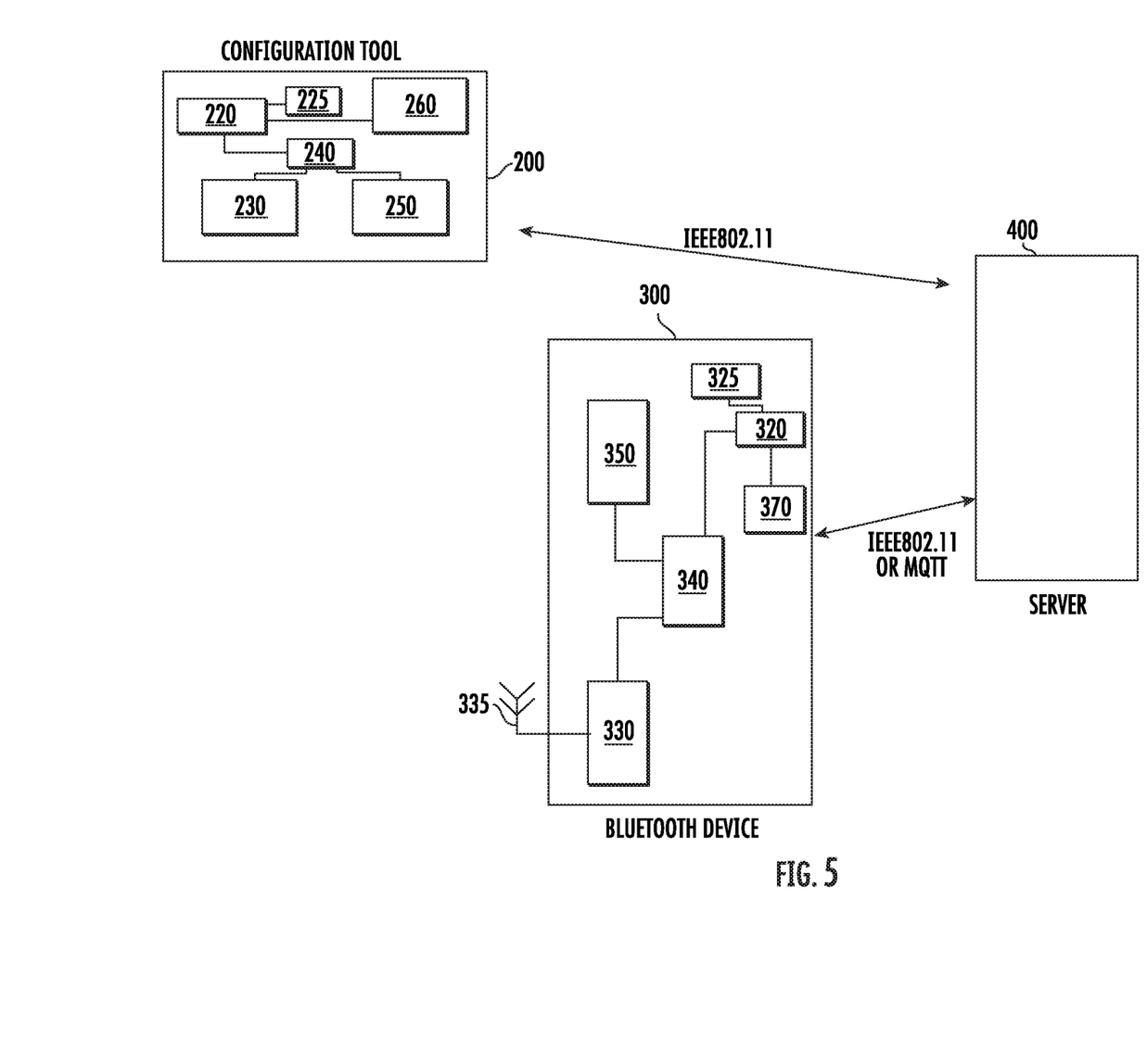
FIG. 5 shows the key exchange between the configuration tool and an upstream server.

In another configuration, the BLUETOOTH® device 300 is not aware of the encryption key. Rather, the BLUETOOTH® device 300 simply forwarded the encrypted message to another device, such as a server 400 located on premises or in the cloud. This may be done using the second network interface 350 or the third network interface 370. The server 400 may be a PC or other suitable computing device that includes storage and interfaces. This configuration is shown in FIG. 5. The BLUETOOTH® device 300 may forward the encrypted broadcasts from the ultra low power network device 10 to the server 400, using any suitable network protocol, such as an IEEE 802.11 based protocol or MQTT running on TLS or TCP/IP. In this embodiment, the second network interface 250 may support an IEEE 802.11 based network protocol. The configuration tool 200 may then securely transmit the shared encryption key, the ECDH secret, and the random numbers (or a subset of this group) directly to the server 400 using a suitable network protocol, such as HTTP, on top of Transport Layer Security (TLS). The server 400 then decrypts the packet and acts on it accordingly.

The system described herein has many advantages. First, the ultra low power network device 10 does not have to incorporate any Bluetooth receive circuitry. Because of this, it also does not need to include the software associated with receiving Bluetooth packets or the software needed to establish connections. This may reduce the circuitry needed, and also reduce the size of the instructions needed by the device. Additionally, despite the fact that the device lacks the ability to receive Bluetooth packets, it is still possible to create a shared encryption key so that outgoing communications from the ultra low power network device are encrypted. Further, through use of a NFC tag, other configuration information can also be supplied to the ultra low power network device. Additionally, the process used to generate the encryption key is very low power, since the NFC tag can exchange data using only harvested energy.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An ultra low power network device, comprising:
a Near Field Communications (NFC) tag;
a network interface that utilizes a BLUETOOTH® network protocol;
a processing unit; and
an associated memory device, comprising instructions, which when executed by the processing unit, enable the ultra low power network device to:
use the NFC tag to receive and share information with an external configuration tool to create a shared encryption key; and
use the shared encryption key to transmit encrypted packets using the network interface.

2. The ultra low power network device of claim 1, wherein the ultra low power network device transmits the encrypted packets as advertisement broadcasts.

3. The ultra low power network device of claim 1, wherein periodically, the ultra low power network device generates a new shared encryption key.

4. The ultra low power network device of claim 3, wherein the new shared encryption key is generated after a predetermined amount of time has elapsed or a predetermined number of messages have been sent.

5. An ultra low power network device, comprising:
a Near Field Communications (NFC) tag;
a network interface;
a processing unit; and
an associated memory device, comprising instructions, which when executed by the processing unit, enable the ultra low power network device to:
use the NFC tag to interact with an external configuration tool to create a shared encryption key; and
use the shared encryption key to transmit encrypted packets using the network interface; and
wherein, to create the shared encryption key, the associated memory device further comprises instructions, which when executed by the processing unit, enable the ultra low power network device to:

create an ephemeral elliptic curve key, resulting in a device EC public key and a device EC private key;
create a first random number;
share the device EC public key and the first random number by writing the device EC public key and the first random number in the NFC tag;
receive a configurator EC public key and a second random number from the external configuration tool;
read the configurator EC public key and the second random number from the NFC tag;
calculate an elliptic curve Diffie-Hellman (ECDH) secret using the device EC private key and the configurator EC public key; and
use a key derivation function that takes the ECDH secret, the first random number and the second random number as inputs to create the shared encryption key.

6. The ultra low power network device of claim 5, wherein after creating the shared encryption key, the associated memory device further comprises instructions, which when executed by the processing unit, enable the ultra low power network device to:
write an acknowledgement message in the NFC tag, wherein the acknowledgement message comprises the first random number and the second random number encrypted using the shared encryption key.

7. The ultra low power network device of claim 5, wherein the associated memory device further comprises instructions, which when executed by the processing unit, enable the ultra low power network device to periodically refresh the shared encryption key; wherein the instructions enable the ultra low power network device to:
increment the first random number and the second random number by a predetermined quantity to create a new first random number and a new second random number; and
use a key derivation function that takes the ECDH secret, the new first random number and the new second random number as inputs to create a new shared encryption key.

8. An ultra low power network device, comprising:
a Near Field Communications (NFC) tag;
a network interface;
a processing unit; and
an associated memory device, comprising instructions, which when executed by the processing unit, enable the ultra low power network device to:
use the NFC tag to interact with an external configuration tool to create a shared encryption key; and
use the shared encryption key to transmit encrypted packets using the network interface;
wherein a device EC private key is stored in the ultra low power network device and a device EC public key is made available in an X.509 certificate; and
wherein to create the shared encryption key, the associated memory device further comprises instructions, which when executed by the processing unit, enable the ultra low power network device to:
create a first random number;
share the X.509 certificate or a URL of the X.509 certificate and the first random number by writing the X.509 certificate or the URL of the X.509 certificate and the first random number in the NFC tag;
receive a configurator EC public key and a second random number from the external configuration tool;
read the configurator EC public key and the second random number from the NFC tag;
calculate an elliptic curve Diffie-Hellman (ECDH) secret using the device EC private key and the configurator EC public key; and
use a key derivation function that takes the ECDH secret, first random number and second random number as inputs to create the shared encryption key.

9. The ultra low power network device of claim 8, wherein after creating the shared encryption key, the associated memory device further comprises instructions, which when executed by the processing unit, enable the ultra low power network device to:
write an acknowledgement message in the NFC tag, wherein the acknowledgement message comprises the first random number and the second random number encrypted using the shared encryption key.

10. A system for receiving encrypted messages from an ultra low power network device, comprising:
a BLUETOOTH® network device;
a configuration tool, different from the BLUETOOTH® network device, comprising:
a first network interface supporting Near Field Communications (NFC);
a processing unit; and
an associated memory device; and
an ultra low power network device, comprising:
a NFC tag;
a BLUETOOTH® network interface;
a processing unit; and
an associated memory device, comprising instructions, which when executed by the processing unit, enable the ultra low power network device to:
use the NFC tag to receive and share information with the configuration tool to create a shared encryption key; and
use the shared encryption key to transmit encrypted packets to the BLUETOOTH® network device using the BLUETOOTH® network interface.

11. The system of claim 10, wherein the configuration tool transmits the shared encryption key to the BLUETOOTH® network device.

12. The system of claim 11, wherein the BLUETOOTH® network device and the configuration tool each comprise an additional network interface and the shared encryption key is transmitted securely via the additional network interface.

13. The system of claim 11, wherein the configuration tool comprises a BLUETOOTH® network interface and the shared encryption key is transmitted to the BLUETOOTH® network device using an encrypted point-to-point connection.

14. The system of claim 10, wherein the shared encryption key is generated using two random numbers and a ECDH secret, and the configuration tool transmits the two random numbers and the ECDH secret to the BLUETOOTH® network device.

15. The system of claim 10, further comprising a server in communication with the BLUETOOTH® network device and the configuration tool, wherein the BLUETOOTH® network device transmits the encrypted packets to the server, and the server decrypts the encrypted packets using the shared encryption key.

16. The system of claim 15, wherein the configuration tool securely transmits the shared encryption key to the server.

17. The system of claim 15, wherein the shared encryption key is generated using two random numbers and a ECDH secret, and the configuration tool securely transmits the two random numbers and the ECDH secret to the server.

18. The system of claim 10, wherein the BLUETOOTH® network interface lacks a receive circuit and the ultra low power network device cannot receive communications via the BLUETOOTH® network interface.

\* \* \* \* \*